Dec. 27, 1955  F. D. KORKOSZ  2,728,246
DRIVE APPARATUS

Filed Feb. 2, 1953  2 Sheets-Sheet 1

INVENTOR.
Frank D. Korkosz
BY Ross & Ross
Atty & Agent

Dec. 27, 1955  F. D. KORKOSZ  2,728,246
DRIVE APPARATUS
Filed Feb. 2, 1953  2 Sheets-Sheet 2

INVENTOR.
Frank D. Korkosz
BY

United States Patent Office 2,728,246
Patented Dec. 27, 1955

2,728,246

DRIVE APPARATUS

Frank D. Korkosz, Chicopee, Mass.

Application February 2, 1953, Serial No. 334,545

1 Claim. (Cl. 74—675)

This invention relates to improvements in drive apparatus.

The principal objects of the invention are directed to apparatus for driving various units and while adapted for various and numerous purposes, it is particularly adapted for rotating the light projecting housing or housings of a planetarium or the like.

The apparatus is characterized by means for rotating an output shaft at various speeds in opposite directions and is accomplished by independently operable mechanisms each of which is capable of various speeds and opposite directions of rotation. The mechanisms may be operable simultaneously so that the speed and direction of rotation of one mechanism may be modified by the other thereby to obtain speeds of the output shafts within a wide range and in the direction of rotation desired.

All of the above objects I accomplish by means of such structure and relative arrangements of parts thereof, as will fully appear by a perusal of the description below and by various specific features which will be hereinafter set forth.

Figure 1:
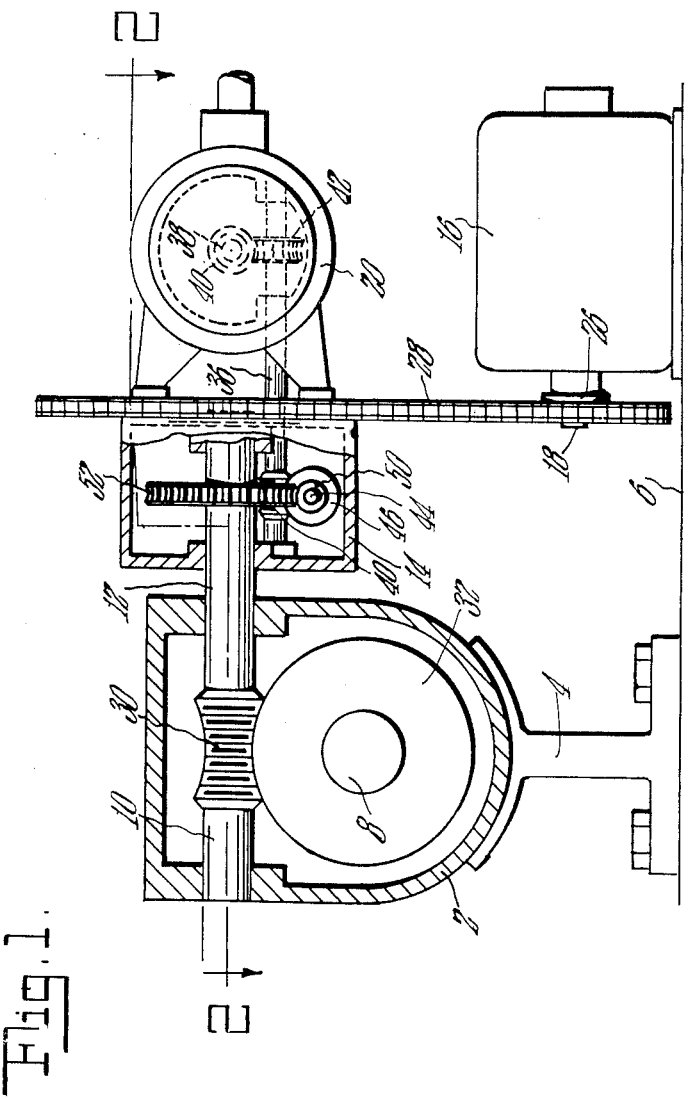
Figure 2:
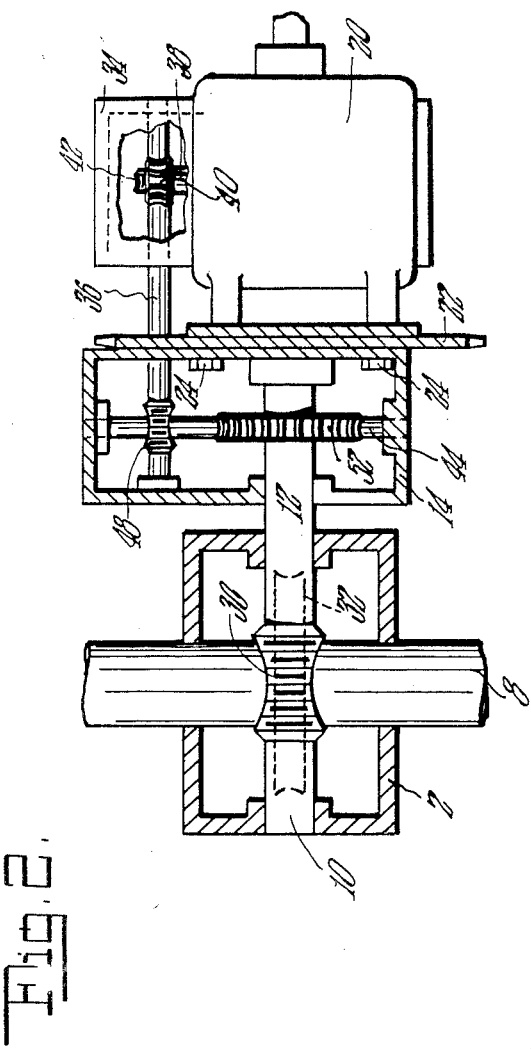

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is a side elevational view of driving mechanism embodying the novel features of my invention with parts in section for clearness; and Fig. 2 is a sectional plan view on the line 2—2 of Fig. 1.

Referring now to the drawings more in detail, the invention will be fully described.

A primary housing 2 is supported by a stand 4 which is secured to a floor, foundation or the like, indicated by 6, as shown in Fig. 1.

An output shaft 8 is disposed on a transverse axis and is rotatable in the housing 2. As shown, opposite ends of the shaft 8 extend from the casing and either or both ends may be utilized for driving or rotating a unit or units to which connected.

A primary drive shaft 10 extends longitudinally of the housing and is journalled therein. An extension 12 of said shaft extends from the housing 2 into a secondary housing 14 and is journalled therein whereby the housing may rotate on shaft part 12 or said shaft may rotate relative to said housing 14.

A primary motor 16 will be of the variable speed, reversing type so that a shaft 18 thereof may be rotated in opposite directions and at various speeds. Control mechanism of well known form will be employed for operation of the motor 16 at the desired speed and direction of rotation desired.

A secondary motor 20, driven sprocket 22 and secondary motor are secured to the secondary housing 14 by bolts 24 or the like, see Fig. 2. A sprocket 26 fixed to shaft 18 of motor 16 is operatively connected by a chain 28 to the sprocket 22 of the secondary housing 14 for rotating said housing.

Intermeshing gearing in the form of a worm 30 and gear 32 fixed to shafts 12 and 8 operatively connect said shafts for driving one from the other.

A casing 34 is fixed to the motor 20 and a secondary drive shaft 36 extends between said casing and the secondary housing 14 and is journalled in said casing and housing, said shaft being parallel to the shaft 10.

A shaft 38 of the motor 20 is connected to shaft 36 by gearing such as a worm 40 fixed to shaft 38 and a gear 42 fixed to shaft 36.

The motor 20 like the motor 16 will be of the reversible, variable speed type so that shaft 36 may be driven in opposite directions and at variable speeds. Control mechanism of ordinary form will be connected to the motor 20 for the desired operation thereof.

A jack shaft 44 is rotatable in the secondary housing 14 and is operatively connected to shaft 36 by a worm gear 46 fixed thereon which is in mesh with a worm 48 thereabove and fixed to shaft 36.

Said shaft 44 has a worm 50 fixed thereon located below and in mesh with a worm gear 52 fixed to drive shaft 10.

With motor 16 energized and motor 20 de-energized, the housing 14 and driven sprocket 22 are keyed to shaft 10 through the gearing between part 12 of shaft 10 and shaft 38 of motor 20 so that shaft 10 is rotated by operation of motor 16 and thereby the output shaft 8 will be rotated. The speed and direction of rotation of shaft 8 will depend on the speed and direction of rotation of motor shaft 18.

With motor 20 energized and motor 16 de-energized, housing 14 will be held stationary through chain and sprocket connections with shaft 18 of motor 16 so that shaft 10 is driven from shaft 38 of motor 20 through the gearing connecting said shafts 10 and 38 with shaft 44. The direction of rotation and speed of shaft 10 and thereby that of output shaft 8 will depend upon that of motor shaft 38.

Motors 16 and 20 are independently operable so that the shafts thereof will be rotated at such speeds and in such directions as may be desired. Controls of well known form will control energy to the motors from a suitable source of energy so as to obtain the desired speed and direction of the motor shafts independently of one another.

The motors may be operated independently or simultaneously depending upon the speed and direction of rotation desired of the output shaft. The motors may be operated simultaneously in such a manner that the speed of one motor shaft will alter or modify the speed and direction of the output shaft 8, and thereby it is possible to obtain any desired speed and direction of rotation of shaft 8.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Apparatus for rotating the light projection housing of a planetarium comprising in combination, a primary housing fixed to a stationary support, a primary shaft and an output shaft journalled on right angular axes in said housing and gearing connecting said shafts, a secondary housing journalled for rotation on said primary shaft, a primary reversible motor and driving connections between said motor and secondary housing for rotating the latter, a secondary reversible motor fixed to said secondary housing, a secondary shaft journalled in said secondary housing and gearing between said secondary shaft and secondary motor, and driving connections in said secondary housing between said secondary and primary shafts, all adapted and arranged whereby said primary shaft may be driven by energizing either the primary or secondary motor or the speed and direction of rotation of said shaft brought about by energizing of one said motor may be modified by energizing the other said motor.

References Cited in the file of this patent

UNITED STATES PATENTS

| 792,748 | Arnold | June 20, 1905 |
| 1,134,769 | Smith | Apr. 6, 1915 |
| 1,343,107 | Barath | June 8, 1920 |
| 1,564,318 | Bower | Dec. 8, 1925 |

FOREIGN PATENTS

| 489,315 | Germany | Jan. 15, 1930 |
| 726,844 | Germany | Oct. 21, 1942 |